United States Patent [19]
Mahlman

[11] 3,899,439
[45] Aug. 12, 1975

[54] METHOD OF PREPARING AQUEOUS DISPERSIONS OF HYDROXYPROPYL CELLULOSE

[75] Inventor: Bert H. Mahlman, West Chester, Pa.

[73] Assignee: Hercules Incorporated, Wilmington, Del.

[22] Filed: Mar. 12, 1973

[21] Appl. No.: 340,403

[52] U.S. Cl.............. 252/311; 106/189; 106/197 R; 106/198; 106/203; 252/314; 252/316
[51] Int. Cl.² ......................................... B01J 13/00
[58] Field of Search ............ 252/311; 106/189, 198, 106/203

[56] References Cited
UNITED STATES PATENTS

| | | | |
|---|---|---|---|
| 3,251,824 | 5/1966 | Battista | 106/203 X |
| 3,475,187 | 10/1969 | Kane | 106/203 X |
| 3,485,651 | 12/1969 | Ganz | 106/198 X |

*Primary Examiner*—Richard D. Lovering
*Attorney, Agent, or Firm*—William S. Alexander

[57] ABSTRACT

Normally water-soluble hydroxypropyl ethers of cellulose are dispered in particulate form in a mixture of water and other hydroxypropyl cellulose solvent from a specified class. Preferred solvent is an aliphatic alcohol of 3 to 6 carbon atoms.

3 Claims, No Drawings

METHOD OF PREPARING AQUEOUS DISPERSIONS OF HYDROXYPROPYL CELLULOSE

This invention relates to a process for preparing dispersions of water-soluble hydroxypropyl cellulose. More specifically, it relates to the preparation of such dispersions with low viscosity in a predominantly aqueous system.

The use of dispersion systems is well known in a number of fields of art and, in particular, in the coatings and adhesives art. For example, the application of a coating by spraying, brushing, or printing a dispersion of a film-former on a substrate followed by drying and, often, heating to cause coalescense is a time-honored technique. The use of a dispersion greatly simplifies the application of the coating since the dispersion is usually considerably less viscous than a solution of the same film-former would be.

Most dispersion coating and adhesive systems are based on water as the continuous dispersion medium. The reason for this is economic, as well as for safety's sake. Recently, environmental legislation limiting the amounts of organic chemical vapors that may be put into the atmosphere has made the use of aqueous systems almost mandatory.

Obviously, the necessity to use water as the continuous phase of a film-forming dispersion poses a problem in applications where the film-forming phase is a water-soluble polymer. One such polymer is hydroxypropyl cellulose, which is soluble in water at low temperatures, although it is insoluble at elevated temperatures. Water solutions of this polymer are impractical for many uses since at the concentrations desired their viscosities are too high for application, as by spraying, brushing or printing.

It is the purpose of this invention to provide a method of preparing a low viscosity aqueous dispersion of particulate hydroxypropyl cellulose. Surprisingly, the method contemplated involves the use of two liquids, both of which normally are solvents or swelling agents for the hydroxypropyl cellulose.

In accordance with the method of the invention, hydroxypropyl cellulose is dispersed in a mixture of water and an effective amount of an organic compound having at least one functional group capable of complexing with the polar groups on or associated with the hydroxypropyl cellulose. The organic compound will sometimes hereinafter be referred to as an "insolubilizer."

The hydroxypropyl cellulose insolubilizers which are employed in the dispersions according to this invention are materials containing a polar functional group and a portion which is hydrophobic in nature, e.g., a hydrocarbon residue. Typical of the polar functional groups which are effective are halogen, hydroxyl, nitro, nitrile and amino groups. These functional groups are probably able to form complexes with the hydroxyl groups on hydroxypropyl cellulose in the presence of water, whereby the solubility of both the hydroxypropyl cellulose and the insolubilizer is reduced.

The insolubilizers are characterized by being solvents for hydroxypropyl cellulose, at least to a minimum, measurable degree in ordinary circumstances. Generally speaking, however, their solvent power for hydroxypropyl cellulose can be less than that of water.

It has been found that only certain materials which are normally hydroxypropyl cellulose solvents are effective as insolubilizers in the method according to this invention. The efficacy of a material as an insolubilizer as well as the effective range of concentration of it with respect to the water employed is affected at least in part by the water solubility of the solvent. Effective materials include: methylene chloride at 2–5 percent; nitromethane at 5–15 percent; acrylonitrile at 5–15 percent; N-propyl alcohol at 20–30 percent; n-, sec- and iso-butyl alcohols at 6–20 percent and amyl and hexyl alcohols including cyclohexanol at 4–10 percent; pentyl, hexyl, heptyl and octylamines at 5–15 percent; and phenol and alkyl substituted phenols containing up to eight carbons in the alkyl substituent or substituents at 5–20 percent. The preferred compounds for use as insolubilizers are primary aliphatic alcohols having the hydroxyl group attached to a chain of 3 to 6 carbon atoms. Monohydroxy alcohols of this description are particularly preferred. These materials appear to exhibit the most favorable solubility characteristics, are very readily obtainable, and, in most cases, are less objectionable to handle than other organic compounds. Methylene chloride is the preferred additive where flammability is a problem.

Dispersions can be prepared according to this invention from any water-soluble hydroxypropyl cellulose. Hydroxypropyl cellulose is characterized in terms of its molecular substitution (M.S.) level which indicates the number of hydroxypropyl units present per anhydroglucose unit of the cellulose. M.S. will usually be between about 2 and 10, and preferably 3 to 5. Another important method of characterizing the hydroxypropyl cellulose is its viscosity, measured as a 1 to 10 percent solution in water. This viscosity will most generally be between about 2,500 cps. at 1 percent and 200 cps. at 10 percent.

The invention is also applicable to hydroxypropyl cellulose ethers having small amounts of a second nonionic substituent. Exemplary of such second nonionic substituents are methyl, hydroxyethyl, hydroxybutyl, ethyl, benzyl, ethylamino and allyl groups. The M.S. of the nonionic second substituent will usually be no more than about 0.05 to 1.

As stated hereinabove, hydroxypropyl cellulose is soluble in cold water, but insoluble in hot water. Thus, hydroxypropyl cellulose dissolved in cold water will precipitate if the temperature is increased beyond a certain point, referred to as the "cloud point." This cloud point in water is normally about 20°–50°C. The presence of both the insolubilizer and water in the prescribed ratio causes a lowering of the cloud point of the hydroxypropyl cellulose-liquid system to a temperature below room temperature. Thus, the hydroxypropyl cellulose can be present in particulate, dispersed form in a mixture of liquids in either of which it would normally dissolve to a substantial extent.

To prepare dispersions of the type contemplated herein it is convenient to dissolve the hydroxypropyl cellulose in a blend of the dispersing liquids at low temperature, i.e., at a temperature below the cloud point of the systems being employed and then warm the resultant solution to room temperature. For best results the solution is subjected to vigorous shear agitation while being heated.

In an alternative method of preparing the dispersions, the polymers can be added to the dispersing liquid blend and the temperature lowered to a point only several degrees above the cloud point. At this temperature, the polymer can adsorb the insolubilizer and water in correct quantities to form the gels referred to hereinafter. The blend is then heated slowly to room temperature while it is subjected to shearing forces to effect size reduction to the proper particle size for stable dispersions.

In yet another alternative method, the hydroxypropyl cellulose can be dissolved in water and the insolubilizer added to this solution with agitation at a temperature above the cloud point for the particular blend. When the ratio of water to insolubilizer reaches the optimum point, the hydroxypropyl cellulose will precipitate. Under the influence of the shearing forces the precipitated particles will be small or will be sheared to small size so that they can remain stably dispersed.

The percentage composition of the mixture of water, insolubilizer and hydroxypropyl cellulose is not especially critical. A solids (hydroxypropyl cellulose) content of about 15 to 20 percent is optimum for carrying out the precipitation and particle forming step. For this concentration, the liquid phase will contain 2–30 percent, usually about 4 to 20 percent, insolubilizer and about 96 to 80 percent water. Optimum concentrations have been discussed hereinabove for specific insolubilizers.

The dispersed polymer particles appear to be a swollen gel containing hydroxypropyl cellulose, water and insolubilizer in equilibrium amounts. A small amount of polymer and the uncomplexed insolubilizer remain in aqueous phase. The particles are about 1 to 50 microns in diameter and remain stably suspended as discrete, unagglomerated particles for long periods of time without the use of any extraneous dispersion aid such as a surfactant.

Preparation of dispersions according to this invention is illustrated by the following examples. Parts and percentages are by weight unless otherwise indicated.

EXAMPLE 1

A mixture of 1,395 parts water, 105 parts n-butanol and 300 parts hydroxypropyl cellulose having an M.S. of ~3.8 was charged to a ball mill at a temperature of 25°C. With the temperature maintained at 25°C., the mixture was ground for 48 hours. A white, milky dispersion of particles resulted. By microscopic examination, the particles were found to be mostly in the 1 to 3 micron size range.

At room temperature, the particles remained dispersed after sitting for 90 days.

EXAMPLE 2

A mixture of 36.5 parts water, 6.0 parts n-butanol and 7.5 parts benzyl modified hydroxypropyl cellulose having an M.S. of ~3.8 was prepared and stirred vigorously for 5 minutes in a Sorvall Omni-Mixer, having a high speed rotary blade stirrer, while immersed in tap water at 10°–15°C. A smooth, milk-white dispersion resulted. Polymer particles in this dispersion ranged in size from about 1 to about 10 microns.

EXAMPLE 3

In this example 32 parts of water, 2.5 parts of amyl alcohol and 6 parts of benzyl modified hydroxypropyl cellulose having an M.S. of ~3.7 were employed. These materials were blended and agitated for five minutes at a slow speed and for five minutes at high speed in the Sorvall Omni-Mixer while immersed in cold water. A stable, fluid dispersion of ~1 to ~10 micron particles resulted.

EXAMPLE 4

A blend of 256 parts water, 12.1 parts amyl alcohol and 48 parts benzyl modified hydroxypropyl cellulose (M.S. ~4.0) was charged to the Sorvall Omni-Mixer. This was agitated at high spped for 13 minutes at 3° to 5°C. then allowed to warm to room temperature while continuing to stir. A stable white, milky dispersion having a viscosity of about 22 cps. at 35°C. resulted. Particles were predominantly 1 to 3 microns in diameter.

EXAMPLE 5

A mixture was prepared comprised of 2292 parts water, 258 parts n-butanol and 450 parts hydroxypropyl cellulose (M.S. ~3.9). This was cooled to 5°C. whereupon the hydroxypropyl cellulose largely dissolved. The solution was stirred vigorously with a high intensity, high shear Barrington mixer and the temperature was allowed to increase from 5° to 20°C. A stable milk-white dispersion having a viscosity less than 100 cps. resulted. This dispersion passed readily through a 325 mesh screen.

EXAMPLE 6

In this example 1224 parts of water, 50 parts of n-hexanol and 225 parts of benzyl modified hydroxypropyl cellulose (M.S. ~4.0) were blended, cooled to 10°C. and stirred 20 minutes in an ice bath with the Barrington mixer. A stable, fluid dispersion of ~1 to ~10 micron particles resulted.

EXAMPLE 7

A series of organic compounds were employed as insolubilizers for hydroxypropyl cellulose. In each case, a dispersion consisting of 0.5 gram of hydroxypropyl cellulose, 9.5 grams water and insolubilizers as shown was prepared at 25°C. The dispersions were stirred at moderate shear rates at 25°C. Pertinent data are recorded in the table.

| Ex. No. | Insolubilizer | Amount | Appearance |
|---|---|---|---|
| 7 | Methylene Chloride | 1.3 g. | White, fluid, stable |
| 8 | Nitromethane | 1.1 g. | White, fluid, stable |
| 9 | Acrylonitrile | 0.8 g. | White, fluid, stable |
| 10 | n-Hexylamine | 0.8 g. | White, fluid, stable |
| 11 | Phenol | 1.1 g. | White, fluid, stable |
| 12 | Cyclohexanol | 1.0 g. | White, fluid, stable |

Dispersions according to the invention can be dried, either by heat or at room temperature and, upon drying, the polymer coalesces to a continuous film. The ability to coalesce is another unexpected property of these dispersions. One would anticipate that, being a normally solid material suspended in a nonsolvent, the particulate material would be unable to coalesce.

Analysis of the particulate material indicates that the particles are comprised of an equilibrium mixture of hydroxypropyl cellulose, water and insolubilizer. The equilibrium concentrations of the components will vary, depending on the insolubilizer employed and the relative proportions of insolubilizer and water in the dispersion medium. While dispersed, the particles appear to be in a swollen, gel-like state but they are not sufficiently sticky to agglomerate while dispersed. Coalescense can take place during drying due to changes in the compositional ratio of water and insolubilizer whereby the cloud point is increased to a level where the polymer can go into solution for a period of time.

Other ingredients can be incorporated into the dispersions according to this invention to modify the polymer according to the application contemplated therefor. For example, in many applications it is desirable to cross-link the hydroxypropyl cellulose after removal of the solvents and cross-linkers can easily be added to the dispersion without reaction or without affecting the stability. Hydroxypropyl cellulose can be cross-linked with compounds such as dimethylolurea or dimethylolethyleneurea, both of which are soluble in most dispersion media. Other additives such as, e.g., pigments, fillers, stabilizers, or plasticizers can also be added. These other additives can be either dispersed or dissolved in the dispersion medium.

Hydroxypropyl cellulose dispersions prepared according to this invention are useful in a wide variety of applications. For example, they are useful as binders for nonwoven fabrics, particularly where water sensitivity is desirable such as in fabrication of flushable catamenial products, diapers or bandages. They are useful as a binder or adhesive for highly water absorbent paper products such as facial tissues or toilet tissue. Another application is found in preparing cast films for water-sensitive wrapping materials.

What I claim and desire to secure by letters Patent is:

1. A method of preparing a stable dispersion of a normally water-soluble hydroxypropyl cellulose in a predominantly aqueous medium which comprises incorporating said hydroxypropyl cellulose into said predominantly aqueous medium, bringing the temperature of the system to a temperature between about 5°C. above the cloud point and 15°C. below the cloud point and thereafter raising the temperature to at least about 10°C. above the cloud point while subjecting the system to agitation, said predominantly aqueous medium comprising water and an organic material selected from the class consisting of
   a. primary aliphatic alcohols having the hydroxyl group attached to a chain of 3 to 6 carbon atoms,
   b. aliphatic amines having 5–8 carbon atoms,
   c. methylene chloride,
   d. nitromethane, and
   e. acrylonitrile, said organic material being present in an amount sufficient to insolubilize the hydroxypropyl cellulose in water.

2. The method according to claim 1 wherein the system is subjected to shear agitation beginning at a temperature above the cloud point of the system.

3. The method according to claim 1 wherein the system is subjected to shear agitation beginning at a temperature below the cloud point of the system.

* * * * *